United States Patent
Deshmukh et al.

(10) Patent No.: US 8,090,816 B1
(45) Date of Patent: Jan. 3, 2012

(54) SYSTEM AND METHOD FOR REAL-TIME TRIGGERED EVENT UPLOAD

(75) Inventors: Swati Deshmukh, Portland, OR (US); Sunil Kadam, Hillsboro, OR (US); Mike Bacus, Tigard, OR (US)

(73) Assignee: McAfee, Inc., Santa Clara, CA (US)

( * ) Notice: Subject to any disclaimer, the term of this patent is extended or adjusted under 35 U.S.C. 154(b) by 2220 days.

(21) Appl. No.: 10/067,319

(22) Filed: Feb. 7, 2002

(51) Int. Cl.
*G06F 15/16* (2006.01)
*G06F 15/173* (2006.01)

(52) U.S. Cl. ........ 709/224; 709/223; 709/225; 709/232; 709/240

(58) Field of Classification Search .................. 709/224, 709/225, 223, 232, 240
See application file for complete search history.

(56) References Cited

U.S. PATENT DOCUMENTS

| 6,493,755 | B1 * | 12/2002 | Hansen et al. ................. 709/224 |
| 2002/0194490 | A1 * | 12/2002 | Halperin et al. ............... 713/200 |
| 2003/0023866 | A1 * | 1/2003 | Hinchliffe et al. ............. 713/200 |
| 2003/0088680 | A1 * | 5/2003 | Nachenberg et al. ......... 709/229 |
| 2003/0120947 | A1 * | 6/2003 | Moore et al. .................. 713/200 |
| 2003/0131256 | A1 * | 7/2003 | Ackroyd ........................ 713/201 |
| 2003/0145228 | A1 * | 7/2003 | Suuronen et al. ............. 713/201 |

* cited by examiner

*Primary Examiner* — Quang N. Nguyen
(74) *Attorney, Agent, or Firm* — Wong, Cabello, Lutsch, Rutherford & Brucculeri, L.L.P.

(57) ABSTRACT

A method, system, and computer program product reports malware events in real-time and does not cause network congestion that adversely affects the usability of the network. A method of reporting malware events comprises the steps of detecting a malware event, determining a level of the detected malware event, comparing the level of the detected malware event to an event trigger threshold, and transmitting a notification of the detected malware event, based on the comparison of the level of the detected malware event to the event trigger threshold.

39 Claims, 5 Drawing Sheets

US 8,090,816 B1

SYSTEM AND METHOD FOR REAL-TIME TRIGGERED EVENT UPLOAD

FIELD OF THE INVENTION

The present invention relates to protecting computer users from Web sites hosting computer viruses and for protecting Web hosting systems from hosting Web pages that contains links to computer viruses.

BACKGROUND OF THE INVENTION

As the popularity of the Internet has grown, the proliferation of computer viruses has become more common. A computer virus is a program or piece of code that is loaded onto a computer without the knowledge or consent of the computer operator. Most viruses replicate themselves and load themselves onto other connected computers. One way in which viruses proliferate is to load themselves into a computer along with a Web page that a user of the computer has selected. Once the virus has been loaded onto the computer, it is activated and may proliferate further and/or damage the computer or other computers.

Along with the proliferation of computer viruses and other malware has come a proliferation of software to detect and remove such viruses and other malware. This software is generically known as anti-virus software or programs. In order to detect a virus or other malicious program, an anti-virus program typically scans files stored on disk in a computer system and/or data that is being transferred or downloaded to a computer system and compares the data being scanned with profiles that identify various kinds of malware. The anti-virus program may then take corrective action, such as notifying a user or administrator of the computer system of the virus, isolating the file or data, deleting the file or data, etc.

In a networked environment, anti-virus programs are typically active on the networked client systems, as well as on the server systems. Management of the anti-virus programs on the client systems is best carried out by use of network-wide anti-virus administrative applications or management tools. Such management tools typically provide the capability to deploy software, set policies for the functioning of the software, collect properties relating to the operation of the software, and execute other specified tasks on the client systems. The anti-virus programs on each client system typically function in conjunction with the agents of a collection and management program running on one or more servers. The anti-virus programs scan the client systems and based on what they find, generate events, which are transmitted to the collection and management program's agent. The collection and management application may then use the received event information to generate various enterprise-wide reports, such as reports of infections of client systems by malwares and virus profile distribution reports. These reports provide a bird's eye view of the entire network.

Typically, the agent programs report events to the collection and management application on a periodic basis, such as every hour. The period for event reporting is typically modifiable. Alternatively, the collection and management application can request event reports from agent programs as desired.

In a malware outbreak situation, waiting for the periodic event reports to be generated is not adequate, since the situation is changing rapidly and delayed reports are not sufficiently current for corrective action to be taken. However, in order to obtain real-time event reports, the collection and management application must request event reports from agent programs quite frequently. This can cause considerable network congestion and adversely affect the usability of the network.

A need arises for a technique by which real-time malware event reporting can be obtained that does not cause network congestion that adversely affects the usability of the network.

SUMMARY OF THE INVENTION

The present invention is a method, system, and computer program product for reporting malware events in real-time and does not cause network congestion that adversely affects the usability of the network.

In one embodiment of the present invention, a method of reporting malware events comprises the steps of detecting a malware event, determining a level of the detected malware event, comparing the level of the detected malware event to an event trigger threshold, and transmitting a notification of the detected malware event, based on the comparison of the level of the detected malware event to the event trigger threshold.

In one aspect of the present invention, the detecting step comprises the step of detecting the malware event using a malware scanner. The malware event may comprise at least one of completion of a malware scan, a process failure relating to malware scanning, a missing log file, detection of a malware, or failure of a response to a malware.

In one aspect of the present invention, the malware event has one of a plurality of levels. The level of the malware event may comprise one of informational malware events requiring no operator intervention, warning malware events that indicate a process failure, minor malware events that require attention, but are not events that could lead to loss of data, major malware events that need operator attention, critical malware events that need immediate operator attention and could lead to loss of data if not corrected. The event trigger threshold may comprise one of a plurality of levels. The level of the event trigger threshold may comprise one of informational malware events requiring no operator intervention; warning malware events that indicate a process failure; minor malware events that require attention, but are not events that could lead to loss of data; major malware events that need operator attention; critical malware events that need immediate operator attention and could lead to loss of data if not corrected. The malware event may comprise at least one of completion of a malware scan, a process failure relating to malware scanning, a missing log file, detection of a malware, or failure of a response to a malware.

In one aspect of the present invention, the transmitting step comprises the steps of transmitting the notification of the detected malware event in real-time, if the level of the detected malware event is greater than or equal to the event trigger threshold and transmitting the notification of the detected malware event eventually, if the level of the detected malware event is less than the event trigger threshold. The malware event may have one of a plurality of levels. The level of the malware event may comprise one of informational malware events requiring no operator intervention; warning malware events that indicate a process failure; minor malware events that require attention, but are not events that could lead to loss of data; major malware events that need operator attention; critical malware events that need immediate operator attention and could lead to loss of data if not corrected. The event trigger threshold may comprise one of a plurality of levels. The level of the event trigger threshold may comprise one of informational malware events requiring no operator intervention; warning malware events that indicate a process failure; minor malware events that require attention, but are not events that could lead to loss of data; major malware events that need operator attention; critical malware events that need immediate operator attention and could lead to loss of data if not corrected. The malware event may comprise at least one of completion of a malware scan, a process failure relating to malware scanning, a missing log file, detection of a malware, or failure of a response to a malware. The detecting step may comprise the step of detecting the malware event using a malware scanner.

BRIEF DESCRIPTION OF THE DRAWINGS

The details of the present invention, both as to its structure and operation, can best be understood by referring to the accompanying drawings, in which like reference numbers and designations refer to like elements.

DETAILED DESCRIPTION OF THE INVENTION

Figure 1:
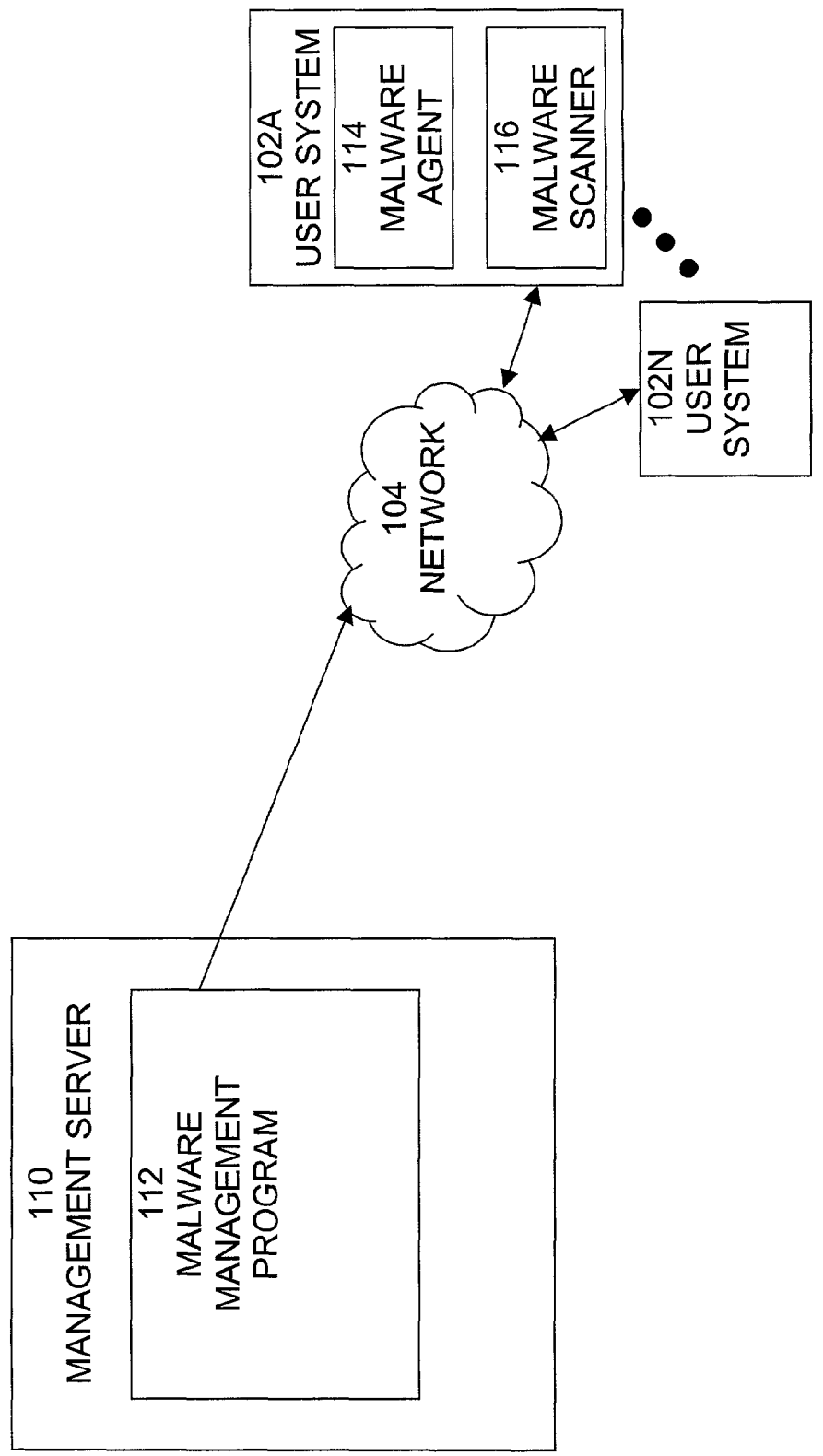
FIG. 1 is an exemplary block diagram of a typical system incorporating the present invention.

An exemplary block diagram of a typical system 100 incorporating the present invention is shown in FIG. 1. System 100 includes a plurality of user systems 102A-N, such as personal computer systems or workstations operated by users, which are communicatively connected to a data communications network 104, such as a public data communications network, for example, the Internet, or a private data communications network, for example, a private intranet. User systems 102A-N generate and transmit requests for information over network 104 to servers, such as Web servers etc. Web servers are computers systems that are communicatively connected to a data communications network, such as network 104, which store and retrieve information and/or perform processing in response to requests received from other systems. Typically, the requests for information or processing are generated by a Web browser software running on user systems 102A-N in response to input from users. The requests for information or processing that are received are processed, and responses, typically including the requested information or results of the processing, are transmitted to the requesting user systems.

Each user system, such as user system 102A, includes a malware agent 114 and malware scanner 116. Malware scanner 116 includes software that can detect and remove viruses and other malwares that may be present in user system 102A. Such software is generically known as anti-virus software or programs. In order to detect a virus or other malicious program, an anti-virus program, such as malware scanner 116, typically scans files, processes, and/or data, which may be present in user system 102A, and/or data that is being transferred or downloaded to user system 102A, and compares the data being scanned with profiles that identify various kinds of malware. The anti-virus program may then take corrective action, such as notifying a user or administrator of the computer system of the virus, isolating the file or data, deleting the file or data, etc. Malware agent 114 is a management agent program that provides the capability to remotely operate and manage an anti-virus program, such as malware scanner 116 as an agent on behalf of, and in communication with, malware management program 112.

Malware management program 112 provides centralized, network-wide management, administration, data collection, and reporting of malware detection and removal. Malware management program 112 communicates with malware agents present in the user systems, provides policies that control the operation of the malware agents, and receives event notification information from the malware agents.

Figure 2:
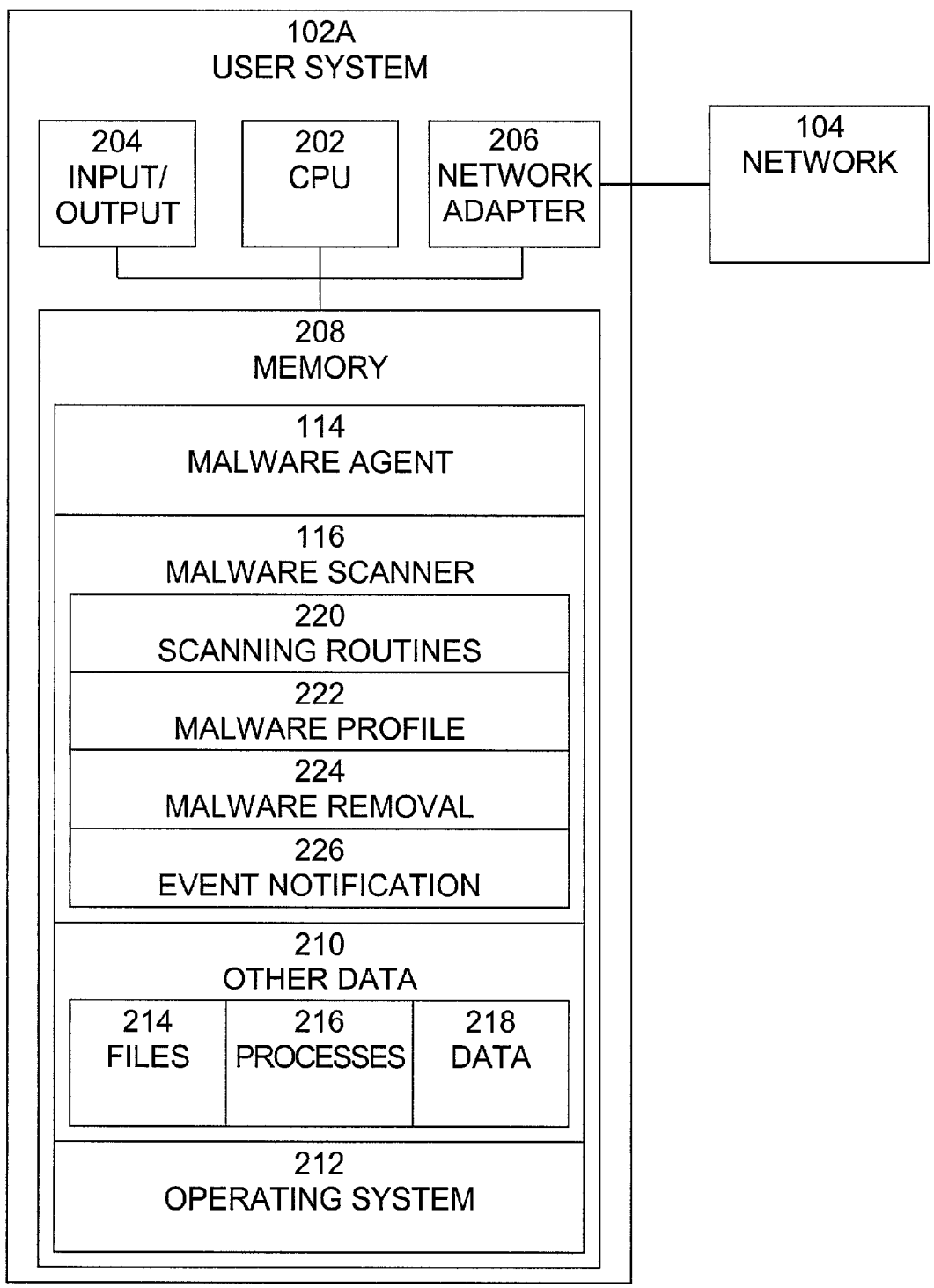
FIG. 2 is an exemplary block diagram of a user system, in which the present invention may be implemented.

An exemplary block diagram of an user system 102A, shown in FIG. 1, is shown in FIG. 2. User system 102A is typically a programmed general-purpose computer system, such as a personal computer, workstation, server system, or minicomputer or mainframe computer. User system 102A includes processor (CPU) 202, input/output circuitry 204, network adapter 206, and memory 208. CPU 202 executes program instructions in order to carry out the functions of the present invention. Typically, CPU 202 is a microprocessor, such as an INTEL PENTIUM® processor, but may also be a minicomputer or mainframe computer processor. Although in the example shown in FIG. 2, user system 102A is a single processor computer system, the present invention contemplates implementation on a system or systems that provide multi-processor, multi-tasking, multi-process, multi-thread computing, distributed computing, and/or networked computing, as well as implementation on systems that provide only single processor, single thread computing. Likewise, the present invention also contemplates embodiments that utilize a distributed implementation, in which user system 102A is implemented on a plurality of networked computer systems, which may be single-processor computer systems, multi-processor computer systems, or a mix thereof.

Input/output circuitry 204 provides the capability to input data to, or output data from, user system 102A. For example, input/output circuitry may include input devices, such as keyboards, mice, touchpads, trackballs, scanners, etc., output devices, such as video adapters, monitors, printers, etc., and input/output devices, such as, modems, etc. Network adapter 206 interfaces user system 102A with network 104. Network 104 may be any standard local area network (LAN) or wide area network (WAN), such as Ethernet, Token Ring, the Internet, or a private or proprietary LAN/WAN.

Memory 208 stores program instructions that are executed by, and data that are used and processed by, CPU 202 to perform the functions of the present invention. Memory 208 may include electronic memory devices, such as random-access memory (RAM), read-only memory (ROM), programmable read-only memory (PROM), electrically erasable programmable read-only memory (EEPROM), flash memory, etc., and electro-mechanical memory, such as magnetic disk drives, tape drives, optical disk drives, etc., which may use an integrated drive electronics (IDE) interface, or a variation or enhancement thereof, such as enhanced IDE (EIDE) or ultra direct memory access (UDMA), or a small computer system interface (SCSI) based interface, or a variation or enhancement thereof, such as fast-SCSI, wide-SCSI, fast and wide-SCSI, etc, or a fiber channel-arbitrated loop (FC-AL) interface.

Memory 208 includes malware agent 114, malware scanner 116, other data 210, and operating system 212. Other data 210 may include files 214, such as data files and executable files, which are typically stored in mass storage devices, processes 216, such as applications programs, etc., which are typically resident in main memory or virtual memory, and data 218. A malware that may infect user system 102A will typically be present in files 214, processes 216, and/or data 218. Operating system 212 provides overall system functionality.

Malware agent 114 is a management agent program that interoperates with malware scanner 116 to provide the capability to remotely operate and manage malware scanner 116 as an agent on behalf of, and in communication with, malware management program 112. Malware scanner 116 includes software that can detect and remove viruses and other malwares that may be present in user system 102A. Such software is generically known as anti-virus software or programs. In order to detect a virus or other malicious program, an anti-virus program, such as malware scanner 116, typically scans files 214, processes 216, and/or data 218, which may be present in user system 102A, and/or data that is being transferred or downloaded to user system 102A, and compares the data being scanned with profiles that identify various kinds of malware. The anti-virus program may then take corrective action, such as notifying a user or administrator of the computer system of the virus, isolating the file or data, deleting the file or data, etc. In conjunction with malware agent 114, malware scanner 116 is such an anti-virus program that operates as an agent on behalf of, and communicating with, malware management program 112, shown in FIG. 1.

Malware scanner 116 includes malware scanning routines 220, malware profiles 222, malware removal routines 224, and event notification routines 226. Malware scanning routines 220 are routines that detect and identify viruses and other malwares. Malware scanning routines 220 typically scan files 214, processes 216, and/or data 218, which may be present in user system 102A, and/or data that is being transferred or downloaded to user system 102A, and compares the data being scanned with profiles that identify various kinds of malware. Malware profiles 222 are typically data files that include information, such as malware signature patterns, that allow malware scanning routines 220 to detect the presence of malwares in files and transferred data that are being scanned by the malware scanner 116, and to identify the detected malwares. Malware scanner 116 typically uses one or more such malware profiles. Malware removal routines are software routines that remove or otherwise deal with the malwares that are identified by malware scanning routines 220. If a virus or other malware is found by malware scanning routines 220, malware scanner 116 can use malware removal routines 224 to respond by performing actions such as terminating processes, quarantining files, cleaning files, deleting files, etc. Event notification routines 226 log and transmit information relating to events generated by malware scanner 116.

Malware scanner 116 interoperates with malware agent 114 to provide the capability to remotely operate and manage the malware detection, removal, and reporting functionality of malware scanner 116. For example, management agent 114 provides the capability to control the scanning performed by scanning routines 220, the configuration of malware profiles 222, the operation of malware removal routines 224, and the operation of event notification routines 226.

Figure 3:
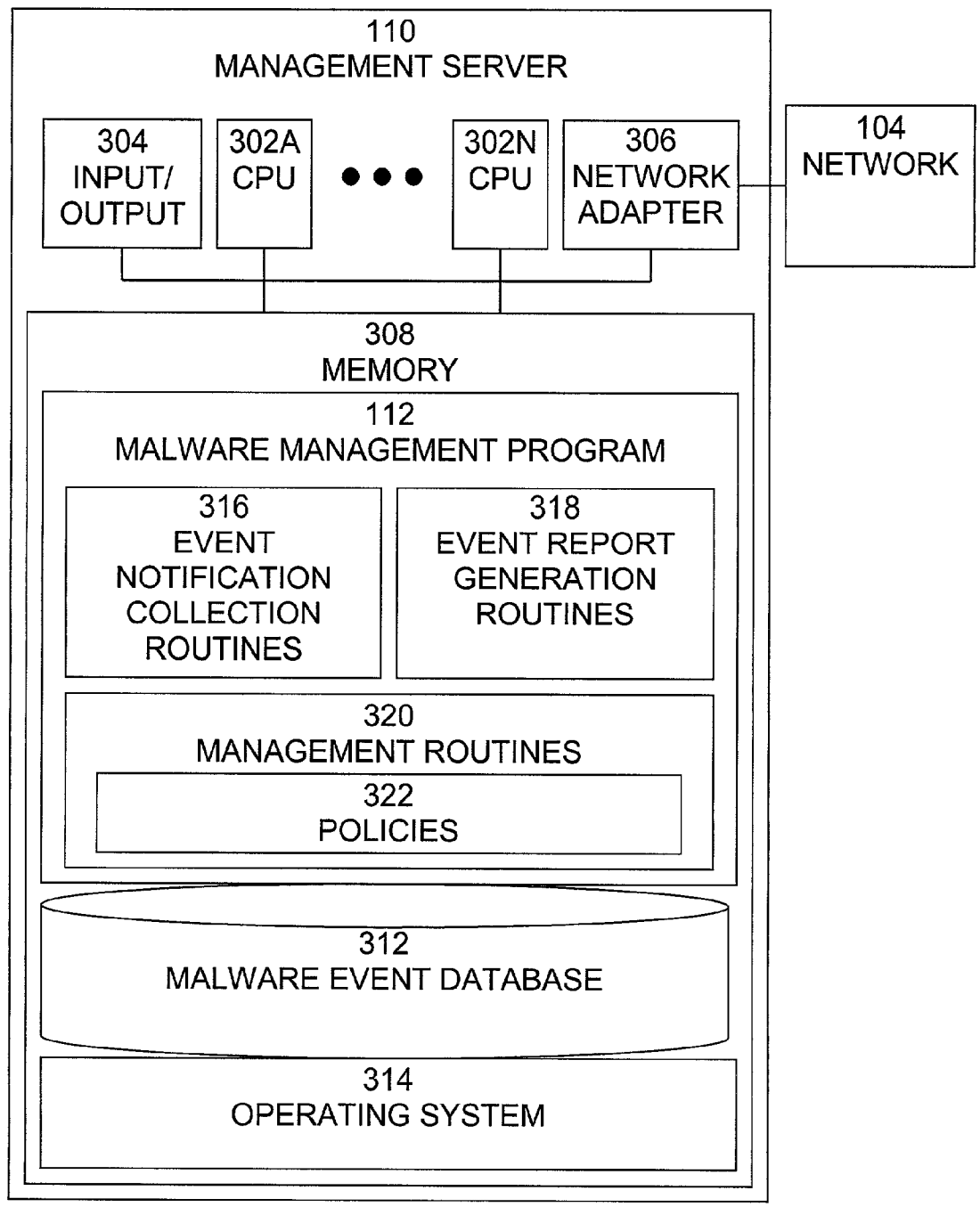
FIG. 3 is an exemplary block diagram of a management server, in which the present invention may be implemented.

An exemplary block diagram of a management server 110, shown in FIG. 1, is shown in FIG. 3. Management server 110 is typically a programmed general-purpose computer system, such as a personal computer, workstation, server system, and minicomputer or mainframe computer. Management server 110 includes one or more processors (CPUs) 302A-302N, input/output circuitry 304, network adapter 306, and memory 308. CPUs 302A-302N execute program instructions in order to carry out the functions of the present invention. Typically, CPUs 302A-302N are one or more microprocessors, such as an INTEL PENTIUM® processor. FIG. 3 illustrates an embodiment in which management server 110 is implemented as a single multi-processor computer system, in which multiple processors 302A-302N share system resources, such as memory 308, input/output circuitry 304, and network adapter 306. However, the present invention also contemplates embodiments in which management server 110 is implemented as a plurality of networked computer systems, which may be single-processor computer systems, multi-processor computer systems, or a mix thereof.

Input/output circuitry 304 provides the capability to input data to, or output data from, management server 110. For example, input/output circuitry may include input devices, such as keyboards, mice, touchpads, trackballs, scanners, etc., output devices, such as video adapters, monitors, printers, etc., and input/output devices, such as, modems, etc. Network adapter 306 interfaces management server 110 with network 104. Network 104 may include one or more standard local area network (LAN) or wide area network (WAN), such as Ethernet, Token Ring, the Internet, or a private or proprietary LAN/WAN.

Memory 308 stores program instructions that are executed by, and data that are used and processed by, CPUs 302A-N to perform the functions of management server 110. Memory 308 may include electronic memory devices, such as random-access memory (RAM), read-only memory (ROM), programmable read-only memory (PROM), electrically erasable programmable read-only memory (EEPROM), flash memory, etc., and electro-mechanical memory, such as magnetic disk drives, tape drives, optical disk drives, etc., which may use an integrated drive electronics (IDE) interface, or a variation or enhancement thereof, such as enhanced IDE (EIDE) or ultra direct memory access (UDMA), or a small computer system interface (SCSI) based interface, or a variation or enhancement thereof, such as fast-SCSI, wide-SCSI, fast and wide-SCSI, etc, or a fiber channel-arbitrated loop (FC-AL) interface.

In the example shown in FIG. 3, memory 308 includes malware management program 112, malware event database 312, and operating system 314. Operating system 314 provides overall system functionality. Malware management program 112 provides centralized, network-wide management, administration, data collection, and reporting of malware detection and removal. Malware management program 112 communicates with malware agents present in the user systems, provides policies that control the operation of the malware agents, and receives event notification information from the malware agents.

Malware management program 112 includes event notification collection routines 316, event report generation routines 318, and management routines 320. Event notification collection routines 316 receive and collect notifications of malware events from malware agents present in the user systems and store the received event notifications in malware event database 312. Malware event database 312 stores the received event notification data for further processing. Event report generation routines 318 access malware event database 312 and generate reports about the malware events that are stored in malware event database 312. Management routines 320 provide centralized management of the malware agents in the user systems. The configuration and operation of the malware agents is specified by policies 322, which are used by management routines 320 to configure and control the operation of the malware agents.

As shown in FIG. 3, the present invention contemplates implementation on a system or systems that provide multi-processor, multi-tasking, multi-process, and/or multi-thread computing, as well as implementation on systems that provide only single processor, single thread computing. Multi-processor computing involves performing computing using more than one processor. Multi-tasking computing involves performing computing using more than one operating system task. A task is an operating system concept that refers to the combination of a program being executed and bookkeeping information used by the operating system. Whenever a program is executed, the operating system creates a new task for it. The task is like an envelope for the program in that it identifies the program with a task number and attaches other bookkeeping information to it. Many operating systems, including UNIX®, OS/2®, and WINDOWS®, are capable of running many tasks at the same time and are called multitasking operating systems. Multi-tasking is the ability of an operating system to execute more than one executable at the same time. Each executable is running in its own address space, meaning that the executables have no way to share any of their memory. This has advantages, because it is impossible for any program to damage the execution of any of the other programs running on the system. However, the programs have no way to exchange any information except through the operating system (or by reading files stored on the file system). Multi-process computing is similar to multi-tasking computing, as the terms task and process are often used interchangeably, although some operating systems make a distinction between the two.

Figure 4:
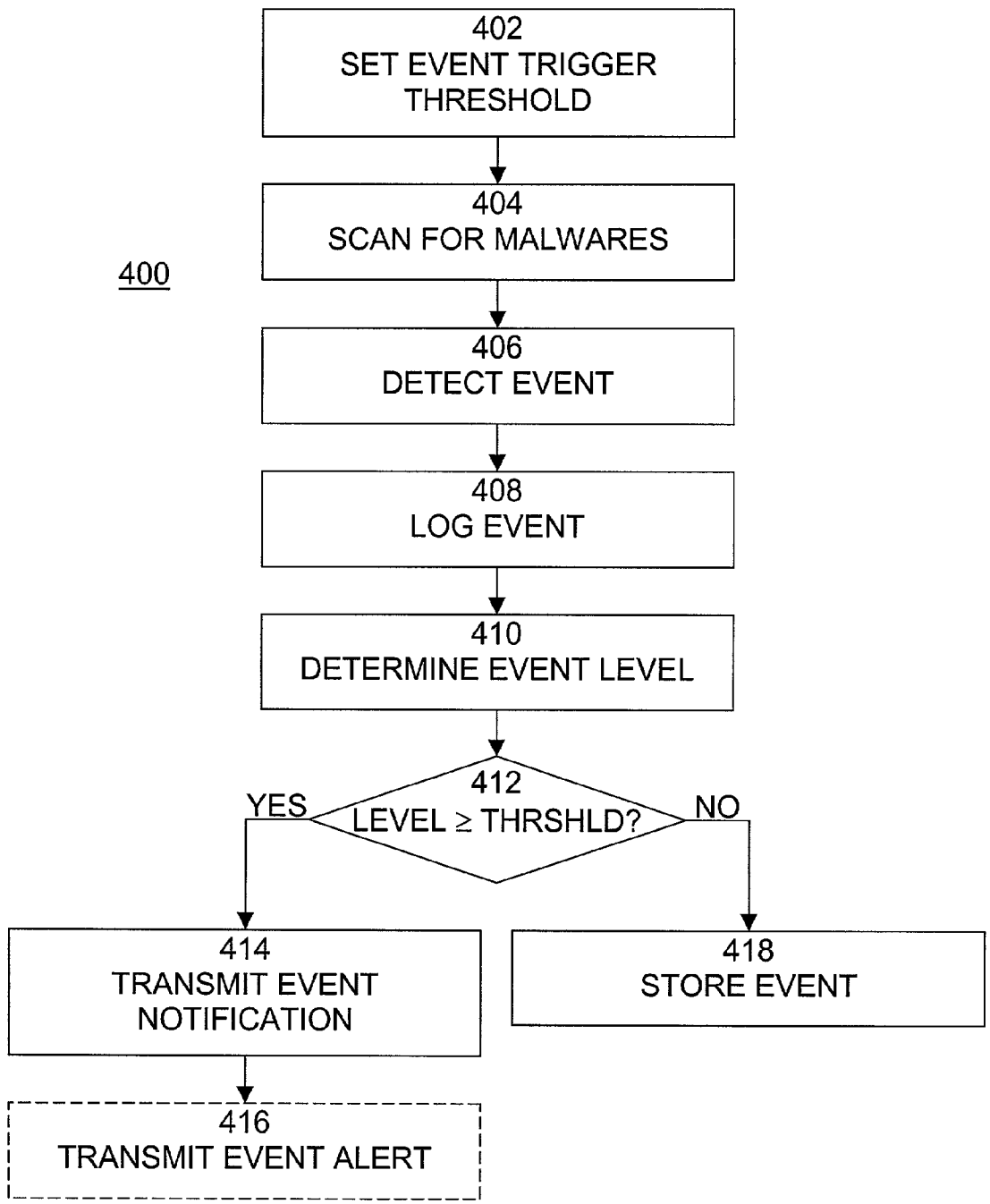
FIG. 4 is an exemplary flow diagram of a process for reporting malware events.

An exemplary flow diagram of a process 400 for immediate triggered event upload is shown in FIG. 4. It is best viewed in conjunction with FIG. 1. Process 400 begins with step 402, in which event trigger thresholds are set for the malware agents that are present in the user systems 102A-N. The event trigger thresholds are set at management server 110 in malware management program 112. Typically, the event trigger thresholds are set by setting policies in malware management program 112. The specified event trigger thresholds are then distributed to the malware agents in the user systems along with other specified policy settings. Preferably, there are a plurality of levels of event trigger thresholds, in order to provide flexibility in tailoring event reporting to the particular network installation in use and to the particular situation that are likely to be encountered. An example of a multi-level event trigger threshold scheme is shown in Table A:

| Severity | Meaning | Example |
| --- | --- | --- |
| 0 | Informational | Events requiring no operator intervention - such as malware scan complete |
| 1 | Warning | Events that indicate a process failure - such as malware scanner set to scan drive "N:", but no map was currently set for drive "N:" |
| 2 | Minor | Events that require attention, but are not events that could lead to loss of data - such as a missing log file |
| 3 | Major | Events that need operator attention - such as a malware being found |
| 4 | Critical | Events that need immediate operator attention and could lead to loss of data if not corrected - such as a malware being found that cannot be repaired |

Table A

For example, the event trigger threshold may be set at level 2-Minor, which means that any event with a severity level equal to or greater than 2 will trigger an immediate upload of events.

In step 404, after the event trigger thresholds have been set in the malware agents present in the user systems 102A-N, the malware scanners proceed and/or continue to scan for malwares. For example, malware scanner 116 scans files, processes, and/or data, which may be present in user system 102A, and/or data that is being transferred or downloaded to user system 102A, and compares the data being scanned with profiles that identify various kinds of malware. Malware scanner 116 uses scanner routines and malware profiles to detect and identify viruses and other malwares. Malware profiles are typically data files that include information, such as malware signature patterns, that allow the malware scanner to detect the presence of malwares in files and transferred data that are being scanned by malware scanner 116, and to identify the detected malwares. Malware scanner 116 typically uses one or more such malware profiles. Malware scanner 116 may also use malware removal routines to remove or otherwise deal with the malwares that are identified by malware scanner 220. If a virus or other malware is found by the malware scanner, malware scanner 116 can use the malware removal routines to respond by performing actions such as terminating processes, quarantining files, cleaning files, deleting files, etc. Malware scanner 116 also uses event notification routines to log and transmit information relating to events generated by malware scanner 116.

In step 406, a malware event is detected. For example, a malware event occurs when malware scanner 116 detects the occurrence of an event related to the operation of malware scanner 116. For example, such events may include the completion of a malware scan, a process failure of or relating to malware scanner 116, a missing log file, detection of a malware, failure of a response to a malware, or any other event related to the operation of malware scanner 116. Typically, the detected malware event is logged to an event repository, in which the event is stored until further processed.

In step 408, the detected malware event is logged to an event repository, which stores events until they are further processed. In step 410, the stored malware event is examined by malware agent 114 to determine its level. For example, if the event is a missing log file, then, if the multi-level event trigger threshold scheme shown in Table A is used, the event would be determined to be a level 2 event.

In step 412, it is determined whether the level of the malware event is greater than or equal to the event trigger threshold that has been set for malware agent 114. If the level of the malware event is greater than or equal to the event trigger threshold that has been set for malware agent 114, then the process continues with step 414, in which notification of the occurrence of the event is transmitted in real-time to malware management program 112. Once malware management program 112 receives the notification of the occurrence of the event, optional step 416 may be performed, in which malware management program 112 may transmit an alert indicating the occurrence of the event. The event alert would be sent to the administrator of the computer system and/or network via a real-time or at least prompt communication media. For example, the event alert may be transmitted via automated pager message or automatically generated email message.

If the level of the malware event is less than the event trigger threshold that has been set for malware agent 114, then the process continues with step 418, in which the malware event is stored in the event repository, until the eventual periodic event transmission to management server 110, or until requested by management server 110.

Figure 5:
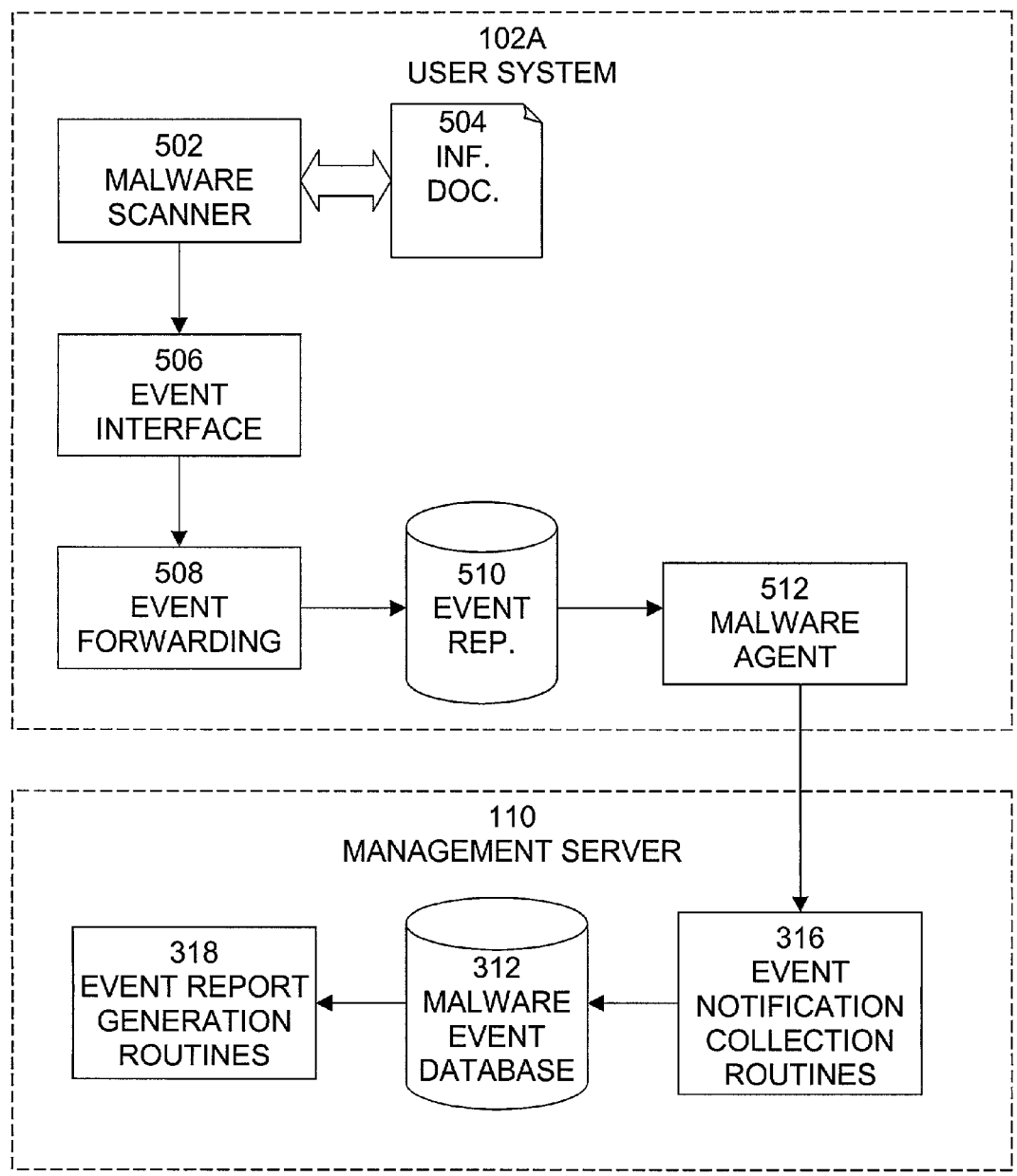
FIG. 5 is an exemplary data flow diagram of one sequence of operation of immediate triggered event upload.

An exemplary data flow diagram of one sequence of operation of immediate triggered event upload is shown in FIG. 5. It is best viewed in conjunction with FIG. 1. As shown in FIG.

5, a malware agent 512, which is present on a user system, such as user system 102A, interacts with a management server 110. A malware scanner 502 scans files stored on disk in user system 102A and/or data that is being transferred or downloaded to user system 102A and compares the data being scanned with profiles that identify various kinds of malware. When malware scanner 502 detects some condition, such as the presence of an infected document, or some error, such as the absence of a log file, malware scanner 502 generates an event corresponding to the detected condition or error. For example, if malware scanner 502 detects an infected document, such as infected document 504, malware scanner 502 generates an event that indicates that infected document 504 was detected. The generated event is transmitted from malware scanner 502 via event interface 506 and event forwarding routines 508 to event repository 510, in which the event is logged and stored until further processed. For example, in a typical implementation, malware scanner 502 may use event interface 506 to call event forwarding routines 508, which may be implemented as dynamic link library (DLL) routines. Data relating to the generated event are passed to event forwarding routines 508 when event forwarding routines 508 called. Event forwarding routines 508 then, if necessary, convert the passed data to the appropriate format and store the data in event repository 510.

Malware agent 512 examines the events stored in event repository 510 and determines how the events should be transmitted. Malware agent 512 determines the level of the event and compares the determined level to the event trigger threshold. If the level is greater than or equal to the event trigger threshold, then malware agent 512 immediately transmits notification of the event to management server 110. If the level is less than the event trigger threshold, notification of the event is not transmitted until the eventual periodic event transmission, or upon request by management server 110. Of course, one of skill in the art would recognize that other comparison conditions may be used.

Transmitted event notification are received at management server 110 by event notification collection routines 316. Event notification collection routines 316 receive and collect notifications of malware events from malware agents present in the user systems and store the received event notifications in malware event database 312. Malware event database 312 stores the received event notification data for further processing. Event report generation routines 318 access malware event database 312 and generate reports about the malware events that are stored in malware event database 312.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such as floppy disc, a hard disk drive, RAM, and CD-ROM's, as well as transmission-type media, such as digital and analog communications links.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A method of reporting malware events comprising the steps of:
    detecting a plurality of malware events each with one of a plurality of levels using a malware scanner, the plurality of malware events comprising completion of a malware scan, a process failure relating to malware scanning, a missing log file, detection of malware, and failure of a response to malware;
    determining a level of a detected malware event;
    comparing the level of the detected malware event to an event trigger threshold with one of a plurality of levels; and
    transmitting a notification of the detected malware event over a network, based on the comparison of the level of the detected malware event to the event trigger threshold;
    wherein the level of the detected malware event comprises one of: informational malware events requiring no operator intervention; warning malware events that indicate a process failure; minor malware events that require attention, but are not events that could lead to loss of data; major malware events that need operator attention; critical malware events that need immediate operator attention and could lead to loss of data if not corrected;
    wherein the level of the event trigger threshold comprises one of: informational malware events requiring no operator intervention; warning malware events that indicate a process failure; minor malware events that require attention, but are not events that could lead to loss of data; major malware events that need operator attention; critical malware events that need immediate operator attention and could lead to loss of data if not corrected;
    wherein the transmitting step comprises the steps of: transmitting the notification of the detected malware event in real-time, if the level of the detected malware event is greater than or equal to the event trigger threshold; and transmitting the notification of the detected malware event eventually, if the level of the detected malware event is less than the event trigger threshold;
    wherein the event trigger threshold is configurable to control an amount of the notifications that are received in real-time so as to prevent network congestion that adversely affects the usability of the network.

2. The method of claim 1, wherein the method further comprises the step of:
    transmitting an alert to an administrator indicating occurrence of the detected malware event in real-time, if the level of the detected malware event is greater than or equal to the event trigger threshold.

3. The method of claim 1, wherein the event trigger threshold is set at a management server in a malware management program.

4. The method of claim 3, wherein the event trigger threshold is set by setting policies in the malware management program.

5. The method of claim 1, wherein the event trigger threshold is distributed to a plurality of malware agents residing in a plurality of user systems.

6. The method of claim 1, wherein if the level of the detected malware event is less than the event trigger threshold, the notification of the event is not transmitted until an eventual periodic event transmission.

7. The method of claim 1, wherein if the level of the detected malware event is less than the event trigger threshold, the notification of the event is not transmitted until a request by a management server is received.

8. The method of claim 1, wherein the level of the event trigger threshold is selected from a ranked set of levels including, from a least critical to a most critical with progressively greater levels, as follows:
  (1) the informational malware events requiring no operator intervention;
  (2) the warning malware events that indicate a process failure;
  (3) the minor malware events that require attention, but are not events that could lead to loss of data;
  (4) the major malware events that need operator attention; and
  (5) the critical malware events that need immediate operator attention and could lead to loss of data if not corrected.

9. The method of claim 8, wherein the completion of the malware scan corresponds to one of the informational malware events requiring no operator intervention.

10. The method of claim 8, wherein the process failure relating to the malware scanning corresponds to one of the warning malware events that indicate a process failure.

11. The method of claim 8, wherein the missing log file corresponds to one of the minor malware events that require attention, but are not events that could lead to loss of data.

12. The method of claim 8, wherein the detection of the malware corresponds to one of the major malware events that need operator attention.

13. The method of claim 8, wherein the failure of the response to the malware corresponds to one of the critical malware events that need immediate operator attention and could lead to loss of data if not corrected.

14. A system for reporting malware events comprising:
  a processor operable to execute computer program instructions;
  a memory operable to store computer program instructions executable by the processor; and
  computer program instructions stored in the memory and executable to perform the steps of:
    detecting a plurality of malware events each with one of a plurality of levels using a malware scanner, the plurality of malware events comprising completion of a malware scan, a process failure relating to malware scanning, a missing log file, detection of malware, and failure of a response to malware;
    determining a level of a detected malware event;
    comparing the level of the detected malware event to an event trigger threshold with one of a plurality of levels; and
    transmitting a notification of the detected malware event over a network, based on the comparison of the level of the detected malware event to the event trigger threshold;
  wherein the level of the detected malware event comprises one of: informational malware events requiring no operator intervention; warning malware events that indicate a process failure; minor malware events that require attention, but are not events that could lead to loss of data; major malware events that need operator attention; critical malware events that need immediate operator attention and could lead to loss of data if not corrected;
  wherein the level of the event trigger threshold comprises one of: informational malware events requiring no operator intervention; warning malware events that indicate a process failure; minor malware events that require attention, but are not events that could lead to loss of data; major malware events that need operator attention; critical malware events that need immediate operator attention and could lead to loss of data if not corrected;
  wherein the transmitting step comprises the steps of: transmitting the notification of the detected malware event in real-time, if the level of the detected malware event is greater than or equal to the event trigger threshold; and transmitting the notification of the detected malware event eventually, if the level of the detected malware event is less than the event trigger threshold;
  wherein the event trigger threshold is configurable to control an amount of the notifications that are received in real-time so as to prevent network congestion that adversely affects the usability of the network.

15. The system of claim 14, further comprising the step of: transmitting an alert to an administrator indicating occurrence of the detected malware event in real-time, if the level of the detected malware event is greater than or equal to the event trigger threshold.

16. The system of claim 14, wherein the event trigger threshold is set at a management server in a malware management program.

17. The system of claim 16, wherein the event trigger threshold is set by setting policies in the malware management program.

18. The system of claim 14, wherein the event trigger threshold is distributed to a plurality of malware agents residing in a plurality of user systems.

19. The system of claim 14, wherein if the level of the detected malware event is less than the event trigger threshold, the notification of the event is not transmitted until an eventual periodic event transmission.

20. The system of claim 14, wherein if the level of the detected malware event is less than the event trigger threshold, the notification of the event is not transmitted until a request by a management server is received.

21. The system of claim 14, wherein the level of the event trigger threshold is selected from a ranked set of levels including, from a least critical to a most critical with progressively greater levels, as follows:
  (1) the informational malware events requiring no operator intervention;
  (2) the warning malware events that indicate a process failure;
  (3) the minor malware events that require attention, but are not events that could lead to loss of data;
  (4) the major malware events that need operator attention; and
  (5) the critical malware events that need immediate operator attention and could lead to loss of data if not corrected.

22. The system of claim 21, wherein the completion of the malware scan corresponds to one of the informational malware events requiring no operator intervention.

23. The system of claim 21, wherein the process failure relating to the malware scanning corresponds to one of the warning malware events that indicate a process failure.

24. The system of claim 21, wherein the missing log file corresponds to one of the minor malware events that require attention, but are not events that could lead to loss of data.

25. The system of claim 21, wherein the detection of the malware corresponds to one of the major malware events that need operator attention.

26. The system of claim 21, wherein the failure of the response to the malware corresponds to one of the critical malware events that need immediate operator attention and could lead to loss of data if not corrected.

27. A computer program product for reporting malware events, comprising:
   a computer readable storage medium;
   computer program instructions, recorded on the computer readable storage medium, executable by a processor, for performing the steps of detecting a plurality of malware events each with one of a plurality of levels using a malware scanner, the plurality of malware events comprising completion of a malware scan, a process failure relating to malware scanning, a missing log file, detection of malware, and failure of a response to malware;
   determining a level of a detected malware event;
   comparing the level of the detected malware event to an event trigger threshold with one of a plurality of levels; and
   transmitting a notification of the detected malware event over a network, based on the comparison of the level of the detected malware event to the event trigger threshold;
   wherein the level of the detected malware event comprises one of: informational malware events requiring no operator intervention; warning malware events that indicate a process failure; minor malware events that require attention, but are not events that could lead to loss of data; major malware events that need operator attention; critical malware events that need immediate operator attention and could lead to loss of data if not corrected;
   wherein the level of the event trigger threshold comprises one of: informational malware events requiring no operator intervention; warning malware events that indicate a process failure; minor malware events that require attention, but are not events that could lead to loss of data; major malware events that need operator attention; critical malware events that need immediate operator attention and could lead to loss of data if not corrected;
   wherein the transmitting step comprises the steps of: transmitting the notification of the detected malware event in real-time, if the level of the detected malware event is greater than or equal to the event trigger threshold; and transmitting the notification of the detected malware event eventually, if the level of the detected malware event is less than the event trigger threshold;
   wherein the event trigger threshold is configurable to control an amount of the notifications that are received in real-time so as to prevent network congestion that adversely affects the usability of the network.

28. The computer program product of claim 27, further comprising the step of:
   transmitting an alert to an administrator indicating occurrence of the detected malware event in real-time, if the level of the detected malware event is greater than or equal to the event trigger threshold.

29. The computer program product of claim 27, wherein the event trigger threshold is set at a management server in a malware management program.

30. The computer program product of claim 29, wherein the event trigger threshold is set by setting policies in the malware management program.

31. The computer program product of claim 27, wherein the event trigger threshold is distributed to a plurality of malware agents residing in a plurality of user systems.

32. The computer program product of claim 27, wherein if the level of the detected malware event is less than the event trigger threshold, the notification of the event is not transmitted until an eventual periodic event transmission.

33. The computer program product of claim 27, wherein if the level of the detected malware event is less than the event trigger threshold, the notification of the event is not transmitted until a request by a management server is received.

34. The computer program product of claim 27, wherein the level of the event trigger threshold is selected from a ranked set of levels including, from a least critical to a most critical with progressively greater levels, as follows:
   (1) the informational malware events requiring no operator intervention;
   (2) the warning malware events that indicate a process failure;
   (3) the minor malware events that require attention, but are not events that could lead to loss of data;
   (4) the major malware events that need operator attention; and
   (5) the critical malware events that need immediate operator attention and could lead to loss of data if not corrected.

35. The computer program product of claim 34, wherein the completion of the malware scan corresponds to one of the informational malware events requiring no operator intervention.

36. The computer program product of claim 34, wherein the process failure relating to the malware scanning corresponds to one of the warning malware events that indicate a process failure.

37. The computer program product of claim 34, wherein the missing log file corresponds to one of the minor malware events that require attention, but are not events that could lead to loss of data.

38. The computer program product of claim 34, wherein the detection of the malware corresponds to one of the major malware events that need operator attention.

39. The computer program product of claim 34, wherein the failure of the response to the malware corresponds to one of the critical malware events that need immediate operator attention and could lead to loss of data if not corrected.

* * * * *